United States Patent [19]

Fraser

[11] 4,316,933

[45] Feb. 23, 1982

[54] TAPE FOR USE AS THE WARP AND WEFT OF WOVEN FABRICS PARTICULARLY USEFUL FOR PACKAGING

[76] Inventor: Ian E. B. Fraser, The Coach House, Emberton Nr. Olney, Bucks, England

[21] Appl. No.: 171,953

[22] Filed: Jul. 24, 1980

Related U.S. Application Data

[63] Continuation-in-part of Ser. No. 35,412, May 2, 1979, abandoned.

[51] Int. Cl.³ .......................... B32B 5/04; B32B 5/28
[52] U.S. Cl. .................................. 428/294; 428/295; 428/297
[58] Field of Search ...................... 428/294, 295, 297

[56] References Cited

U.S. PATENT DOCUMENTS

| | | | |
|---|---|---|---|
| 2,750,315 | 6/1956 | Tierney | 428/295 |
| 3,073,734 | 1/1963 | Bemmels | 428/294 |
| 3,111,449 | 11/1963 | Gold et al. | 428/40 |
| 3,179,552 | 4/1965 | Hauser et al. | 428/302 |
| 3,562,085 | 2/1971 | Crandal et al. | 428/317 |
| 4,101,706 | 7/1978 | Wolkowicz | 428/395 |
| 4,102,721 | 7/1978 | Carey | 428/317 |
| 4,110,505 | 8/1978 | Prewo | 428/294 |

*Primary Examiner*—William J. Van Balen
*Attorney, Agent, or Firm*—Scrivener, Clarke, Scrivener and Johnson

[57] ABSTRACT

This invention relates to a flat, narrow, high tensile, flexible, extensible, non-adhesive, non-pressure sensitive tape of indeterminate length which is primarily designed for weaving but can also be used for various tieing, binding, winding, and similar purposes.

2 Claims, 3 Drawing Figures

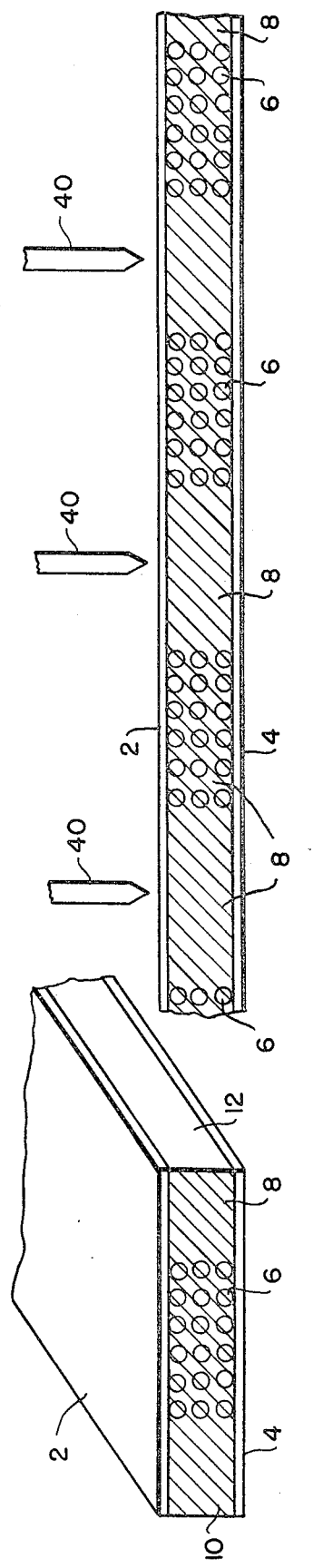
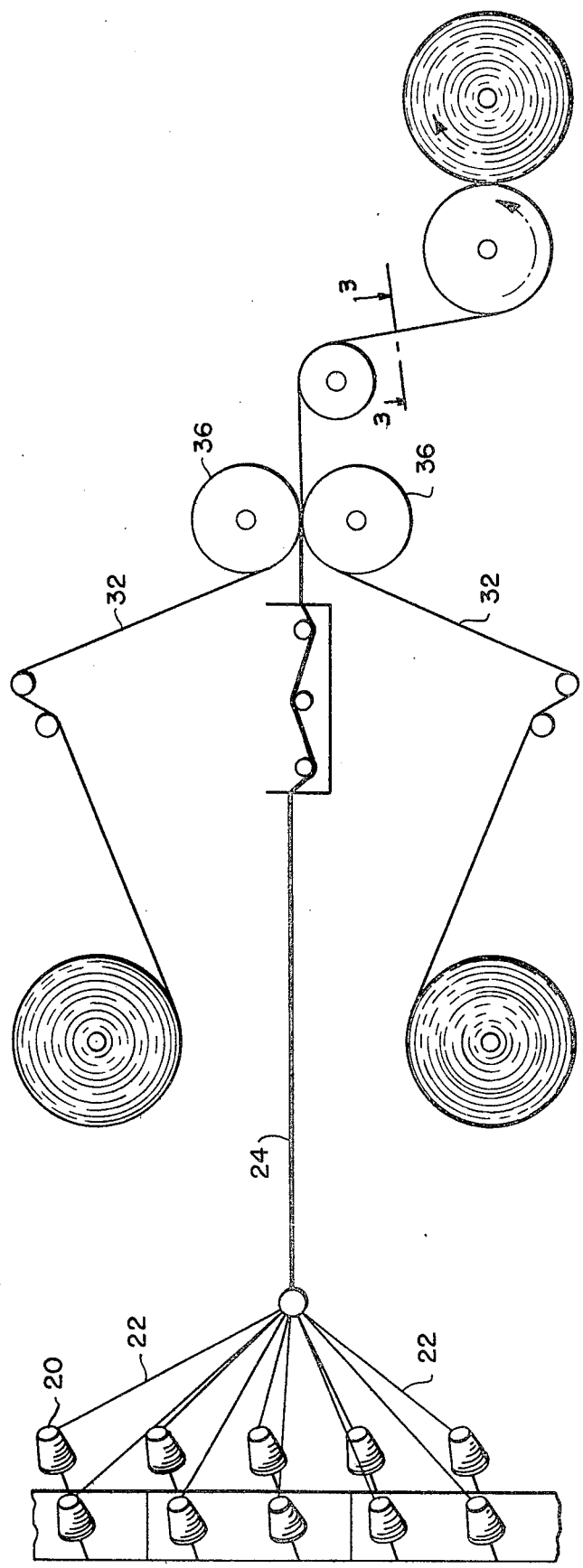

TAPE FOR USE AS THE WARP AND WEFT OF WOVEN FABRICS PARTICULARLY USEFUL FOR PACKAGING

RELATION TO OTHER CASES

This application is a continuation-in-part of my copending application Ser. No. 035,412 filed May 2, 1979 for Reinforced Laminated Tape, now abandoned.

SUMMARY OF THE INVENTION

An elongated flat laminated tape useful for weaving into a fabric comprises two outer layers of non-tacky material which are united across the width of the tape by a bonding material. An elongate thread formed of a plurality of high tensile synthetic filaments is embedded in the bonding material and the filaments are spread to even thickness across most of the width of the tape but not to the edges and extend longitudinally throughout the length of the tape. The spread filaments of the thread layer terminate laterally of the side edges of the tape and such sides up to the edges are connected sheet to sheet only by bonding material.

BACKGROUND OF THE INVENTION

Over the last two decades the industrial woven fabrics industry has experienced a substantial and continuing change from using natural raw materials (e.g., Jute, Sissal, Paper, etc.) to the use of polyolefins (e.g., Polypropylene, Polyethylene) for general industrial uses (e.g., packaging, tieing, binding, etc.) with Low-Medium Duty performance requirements. The competitive price and high, strength efficiency of polyolefins have caused this dominance to be sustained. In the medium-to-heavy duty application areas the relatively high strength and low fabric processing costs of polyolefins have made it even more difficult for natural raw materials to compete. This being particularly so in the heavy duty applications for which relatively large quantitites of natural raw materials and more costly weaving procedures, are required in order for them to comply with demanding performance requirements.

With the passage of time and experience, however, a number of the less desirable aspects of polyolefins have been observed (e.g., non-biodegradable, do not burn to ash, difficult to durably mark or brand, low frictional properties, etc.), and of more recent times, as price differentials between polyolefins and natural fibres narrow and are even eliminated, there is a marked tendency for industry to be more critical of the polyolefins and to seek alternative materials. Whilst natural fibres reasonably, adequately and economically service low-medium duty industrial fabric requirements up to about 100 kg. breaking load (per inch width of fabric), breaking loads in excess of this will be expensive to manufacture from 100% natural raw materials and difficult to market for reasons of price and weight, within a wide range of industries.

A specific application in which polyolefins have fallen from industrial favour, evidencing the need and preference for alternative materials, is that of wool packaging. Damaging contamination of wool by polyolefins occurs when yarns or slivers of materials are caused to be freed into the packaged wool mass as a result of packaging material rupture or by other means. Elongate slivers of polyolefins will draft along with wool fibres during textile processing, ultimately to contaminate woolen end products. As the polyolefins are not dyeable with wool dyes, the undyed slivers within yarns spun from contaminated wool are easily seen and cause serious downgrading of the wool yarns and fabrics woven from same.

Apart from natural and polyolefinic raw materials for general industrial fabric purposes we have but man-made and synthetic fibres. Whilst steel and carbon fibres and such like are available they are not considered to be for general industrial purposes. Though many of the man-made and synthetic fibres are of high strength with tenacity values up to and in excess of 8.0 gm./d.tex those with tenacity values over the range 1.5–4.0 gm./d.tex show high cost for strength. Though such materials will weave into fabrics of sufficient strength, fabric cover and stability for general industrial woven fabrics of 80–250 kg. breaking load, the fact that they are traded for mainly apparel end use rather than industrial applications largely excludes them from the latter for reasons of price and availability.

Better cost for strength relationships occur however with high tensile synthetic fibres of tenacity in excess of 4.0–5.0 gm./d.tex; fibres which have a greater industrial useage orientation than those in the lower tenacity ranges. Though the most available synthetic fibres in the greater than 4.0–5.0 gm./d.tex tenacity range will weave into fabrics of sufficient cover and stability for a wide range of industrial purposes, the weight of synthetic used in order to achieve same, provides however, for more strength than is generally required. To reduce the weight of synthetic raw materials in such fabrics, to be in better accord with lower breaking load requirements e.g., 80–250 kg./inch, thus achieving a more acceptable cost for required strength relationship, means to produce fabrics of inadequate cover, dimensional stability, etc. for a wide range of general industrial end-uses. Thus an objective of this invention was to combine a calculated amount of high tensile synthetic thread (sufficient to provide required strength yet minimize cost) with a natural material, of relatively low cost, in such a way as to render the composite product weavable into fabric providing good fabric cover and stability when woven and having many of the properties of natural materials. In order to sustain fabric cohesion and unity when in use e.g. under load, an important requirement is that the natural/synthetic composite performs as one and not as a mixture with for example the normally weaker natural material breaking down before the synthetic material. It was preferred that the performance of the natural material be upgraded by its incorporation within the composite, acting in unison with the stronger synthetic. A further objective of the invention was to combine both the synthetic and natural materials in such a form as to minimize production and fabrication costs.

To these ends the composite tapes of this invention have been produced to provide alternative material to those in present use, for weaving into industrial fabrics particularly for use, but not exclusively, within a breaking load range of 80–250 kg./in. width and for other uses in the form of high tensile tapes.

DESCRIPTION OF THE DRAWINGS

For a more complete understanding of this invention reference will be made to the drawings herein:

FIG. 1 is a perspective view of a tape as provided by the invention showing the cross-sectional construction thereof, FIG. 2 is a diagram to illustrate the method of tape manufacture, and FIG. 3 is a transverse sectional view of material formed by the apparatus of FIG. 2 and showing the means for cutting it into the tapes of FIG. 1 taken on line 3—3 of FIG. 2.

DESCRIPTION OF THE INVENTION

The invention provides a flat tape (FIG. 1) of approximately 3.5 mm width and 0.4 mm thick comprising upper and lower layers 2, 4 of sheet material and an intermediate layer comprising an elongate thread of spread, continuous filaments 6 which are tightly secured to each other and to both sheet layers by a bonding material 8. The spread filaments of the intermediate thread layers terminate laterally of the side edges 10, 12 and such sides of the tape up to the edges are connected only by the bonding material.

The tape of this invention is flat rather than, for example, a sheet wound thread of approximately circular section, because flat tapes when maintained in flat array within a woven fabric better and more economically effect fabric cover and fabric stability than do yarns of circular section. Fabric production rate from tapes is higher than that from circular yarns (though each carry the same weight, nature and form of material) when achieving the same degree of fabric cover. Thus, a greater weight of the same material is required in yarn form than in tape form, when weaving to the same fabric cover. Such considerations point to the higher fabric production efficiency of tapes from this invention as compared to yarns of circular section.

The two layers of sheet material of the invention are preferably Kraft for the following reasons:

(i) Both upper and lower sides of the tape must be non-sticky so that tapes may be freely unwound from reels or other package forms. Tapes must on contact move freely, surface to either surface, during the course of weaving.

(ii) The surfaces of the upper and lower sides of the tape shall have a positive coefficient of friction; this to be no less than 0.35 as determined by ASTM Test Method D 1894-63. This requirement for such a property applies particularly, but not exclusively, to tapes within fabrics used for packaging purposes. Frictional properties ensure that packages can be formed into stable stacks when loading for and during the course of transport or when high-stacked for storage.

(iii) Tapes in woven fabric form must be easily and durably marked with marking inks or the like, when used as a packaging material (contents identification, delivery instructions, etc.), or printed on in a variety of ways for when the tapes are used as such, or are within a fabric for other than packaging use.

(iv) As waste material tapes should at least in part be biologically degradeable and able to be rendered to a harmless disposable ash on burning.

(v) Preferably, the tapes should be clearly identifiable as of natural material and have many properties of natural materials not least those of moisture exchange, etc.

Whilst both plain and creped packaging Kraft of any commercial weight per square meter will fulfil the above requirements, preference however is shown for a degree of creping consistant with Kraft having extension values over the range 5–7% and a weight over the range 50–100 gm./m$^2$ to ensure that a fully flexible tape is produced. Optimum results in this latter regard are obtained through the use of 50–70 gm./m$^2$ Kraft.

The invention provides for a flat tape enclosing an elongate synthetic high tensile, extensible, thread (without twist) formed of a plurality of continuous filaments of approximately 8–10 mircons in cross-section, preferably but not exclusively, polyamide in composition, for the following reasons:

(i) The thread to be synthetic high tensile so as to minimize the weight of thread per tape whilst maximizing its effective strength. Also to allow for the widest possible breaking load range for different tapes made with threads of different denier (Denier=weight in grams of 9,000 meters of yarn/thread). Units of strength can be less costly in high tensile than in low-medium tensile synthetic material suitable for this application.

(ii) The synthetic high tensile thread to be extensible such that when the tapes are within a packaging fabric under load, a well-shaped package results with the shape being sustained during handling, etc. Extensibility allows tapes and fabrics from same to dissipate sudden impact or point forces within the material before the breaking load limit is reached.

When tapes are used for tieing, binding, or winding, etc. extensibility is important in effecting tight and even pressure application, also, a degree of tape extensibility is preferred during weaving so as to give better control over weaving tension thus better effecting fabric surface evenness as well as the weave regularity in fabrics.

Synthetic thread extension values greater than 10% are advisable with preference for values of 15–20% in order to fulfil the requirements described above.

(iii) The synthetic, high tensile, extensible thread to be without twist or of so little twist, and in the form of a plurality of continuous filaments of small cross section (approx. 8–10 microns), such that the component filaments of the thread are free to be mechanically and/or pressure spread (importantly aided by their small cross section) across most of the tape width thereby maximizing thread contact and hence cohesion (in the presence of a bonding agent), with the sheet material and an even spread of strength across the width of the tape. Those synthetic multifilamentous untwisted threads commercially referred to as 'air intermingled' are preferred. The process of 'air intermingling' is used by manufacturers to cause an intertwining of filaments, rather than needing to impart twist to multifamentous thread, in order to hold the filaments together in the form of a cohesive thread during handling. An even spread of the thread filaments across the width of the tape is of further importance to this invention in that it results in a composite tape evenly flat across most of its width; no uneven 'high spots' occur across the tape width. A narrow 'high spot' within the tape width, and along its length, as does occur if twisted, plied or monofil threads are used, must be avoided in this invention in order for the tape to be packaged into a stable concentrically wound, tape-on-tape large diameter reel which is preferred as the warp tape supply packages in weaving. Tapes with a narrow 'high spot' within their width will, during the process of reel packaging, slide off the package while it is still at a relatively and unacceptably small diameter. By this invention the narrow reinforced tapes can be concentrically wound onto stable reel packages of large diameter because the tapes are of even flatness across most of their width. It is preferred that the thread filaments be evenly spread centrally within the tape (FIG. 1) across no less than 60% of the tape width. Tapes are also packaged by traverse winding as single ends. Whilst large diameter reel packages used for warp supply make for more efficient (continuous) weaving, so also does the meterage of tape that can be wound onto a reel package. As the spreading of the thread filaments makes for minimizing the effective thickness of tapes, this invention further contributes to weaving efficiency by maximizing the meterage of tape that can be wound onto a reel package. It is essential to this invention that the filaments of the thread be continuous. Firstly because threads of discontinuous filaments need to be twisted in order to hold together and secondly, they would have minimal tensile reinforcing effect when spread across the tape.

(iv) A synthetic thread as above under (i), (ii) and (iii), preferably a Polyamide (but not exclusively) because high tensile nylon, complying with all the requirements under (i)–(iii) above, is widely available. Further and more specifically, nylon can be dyed with wool dyes. Thus, when tapes from woven fabrics used for wool packaging, or synthetic fibre containing fragments of same are freed into the wool mass, the synthetic fibre will not be a damaging contamination risk as even if such filaments are processed along with the wool fibres they will be masked in processed wool end-products having been dyed along with the wool fibres. ICI Nylon 114, 115, 1152 and materials of similar composition and properties are suitable. For application to those uses in which dyeability is not important high tensile threads fulfilling the other requirements above can be used eg. polyesters, acrylics, etc.

The invention provides for a material to act as a bonding agent binding the upper and lower layers of sheet material together and each to the filaments of the thread interposed between. Elastomeric adhesives and hot melt extrudable polymer and co-polymer films are used in this application.

Any one of a wide range of aqueous or solvent soluble elastomeric natural or synthetic rubber compounds exemplified by Dunlop DA 330 prevulcanized latex, butadiene co-polymers, ethyl acrylate latexes, acrylonitrile co-polymers can be used in this invention. Materials for hot melt extrusion application being the polymers and co-polymers of low and medium density polyethylene, the polyvinyl acetates, polyvinyl chlorides and such similar compounds.

Both the elastomeric adhesives and the extruded hot melt polymer films, in accord with the requirements of this invention, contribute to substantially improving, within the composite tape, the natural load/extrusion properties of the Kraft component. The improved load/extension properties of the Kraft, due to induced cohesion between sheet material and filaments are however mainly due to spreading the filaments of the thread across most of the tape width. If twisted or plied yarns or monofil threads, which cannot be spread, are used, the bonding materials have but small effect on improving the load/extension properties of Kraft in the composite. When the filaments of a thread are spread across most of the tape width in the presence of an elastomeric adhesive the tape can be tensile loaded up to the extension limit and breaking load limit of the high tensile, extensible (20% extension and more) thread without rupture of the Kraft component. The 'effective' strength and extension of the Kraft becomes that of the high tensile thread even though the natural extension of the Kraft can be but one-third that of the thread and its tensile strength but one-sixth and less than that of the thread. These induced properties in the Kraft allow for tapes and fabrics made from same to remain entire, with no change in surface appearance or fabric cover throughout the full extension and breaking load range of high tensile, extensible synthetic threads. The high degree of cohesion between filaments and sheet material results in threads achieving a higher tenacity performance by 12%+, than the same thread's rated tenacity under optimum conditions of test as a twisted yarn. This is important in minimizing the cost for strength in a composite tape.

Tapes embodying the provisions above when tensile loaded to break show clean rupture across the width of the tape and but few synthetic filaments, if any at all, are exposed at the broken ends. Such containment of filaments within the confines of the tape is important in those end uses where contamination must be avoided.

When the hot melt extruded plastic films are used to effect bonding of the spread filaments, and the bonding of filaments to the sheet material the resultant improvement in the load/extension properties of the Kraft component is not as large as when elastomeric adhesives are used. They do however increase the 'effective' strength of Kraft within the composite tape by upwards of 400% with 100% and more increase in extension. Such changes in the natural load/extension properties of Kraft do allow it to be used as a component of high tensile and extensible tapes over a range of heavy duty industrial end uses without the Kraft being caused to rupture before the reinforcing thread.

As the tape width of this invention is narrow, it is not possible to laminate as a single tape. Rather, a plurality of tapes are laminated in the form of an interconnected web of elongate tapes as shown in FIG. 3 later to be slit by suitable means 40 from the web as separate tapes each containing a multifilamentous thread with the filaments spread across most of the tape width.

As shown in FIG. 2, a flat warp 24 of any number of continuous, multifilamentous threads 22 is drawn from a reel of thread packages 20 and the threads, spaced in elongate parallel array are laid between upper 32 and lower 34 layers of sheet material of width wider than the thread warp. Thread laying and tape lamination is achieved by simultaneously drawing at the same speed both layers of sheet material and the plurality of accurately spaced threads through pressurized nip rollers 36 after application of the bonding material at 38.

Spacings between the threads of the warp 24 are required so that after lamination the individual threads are separated such that sheet to sheet laminated spaces alternate with sheets to thread laminated zones across the web as shown in FIG. 3. The sheet to sheet laminated spacings between threads will be no less than 1.0 mm so that when individual tapes are separated from the interconnected tape web by slitting centrally between laminated filament zones, no less than 0.5 mm of tape width laterally of each edge is laminated sheet to sheet up to each edge throughout the length of the tape.

The elastomeric adhesive is applied just prior to nipping at 36 by either drawing the plurality of threads through a bath of liquid elastomeric adhesive (in solvent or aqueous liquid form), thus using the threads to carry the adhesive between the sheet material or, by different methods equally suitable and well known to those skilled in the art, such as padding or contact rolling the same adhesives onto the threads and/or onto the contact faces of each sheet prior to pressure nipping. When using hot melt extruded films as bonding agents the uppermost nip roller 36 and the sheet material supply package must be relocated so that the hot melt film can be fed directly into the nip between each sheet from above, simultaneously with the thread material as known to those skilled in the art.

Methods so described allow for the production of tapes of different widths and also of different tensile strength by the use of multifilamentous threads differing in tenacity and/or denier. (Denier=weight in grams of 9,000 meters of yarn).

Of particular importance in this invention is that the tapes be separated from within the laminated web of interconnected tapes by slitting centrally between adjacent, parallel spread threads, that is, the positions at which sheet to sheet adhesive lamination only has been effected. The reasons for this relate not only to tape production but also the specific construction of the tape of this invention.

Firstly, reasons which relate to the tape:

Both side edge parts of all tapes must be laminated sheet to sheet only so that delamination is avoided under conditions of use, particularly during weaving. Those tapes with both sides laminated sheet to sheet only up to each edge consistently withstand, without delamination, the forces exerted upon the tape edges during weft tape beat-up in weaving.

An approximately equal width (preferably no less than 0.5 mm) of sheet to sheet only laminate at both sides of a tape (assured by slitting centrally between parallel threads) is important in making a tape which will not buckle or fold along its length during weft beat-up in weaving. Conversely, tapes with the spread thread not centrally positioned relative to tape width, but positioned along one side for example, will often fold or buckle on beat-up at those sites where the asymmetry exists, thus preventing the production of fabric within which the tapes lie evenly flat. For tapes to remain flat within a woven fabric is an objective of this invention.

Again, if the threads are not sufficiently central relative to the width of the tape, it will be caused to coil or spiral about its elongate axis. With a centrally positioned thread, relative to width, a tape will in relaxed state lay flat along its length. The latter state is important for trouble free tape handling, particularly during weft feeding in weaving and when used for binding or winding purposes.

Secondly, those reasons which relate to tape production:

The sheet to sheet only laminated parts of the interconnected web of tapes can be continuously slit without obstruction. Filaments of the thread laying parallel with the direction of slitting and in the path of the slitting knives or blades, will often not be cut. Not only will the tapes be incompletely freed but filaments can be pulled out from within the tape, thus causing tape delamination and serious obstruction to the slitting knives.

While the invention has been described in this specification with particular reference to the manufacture of a tape to be used in making woven packaging material it will be apparent that the utility of the tape is not limited in any way either to packaging or any other material. The tape may be used by itself for any purpose and, when woven, the resulting material may be used for any purpose within the scope of this invention.

Throughout the specification and in the claims the term "sheet material" has been used. While the preferred material of the outer layers of the tape is Kraft, it will be understood that the invention is not limited to that or any other material. The term "sheet material" is therefore to be understood to include any suitable continuous woven or non-woven material.

Tapes when so composited from Kraft sheet material, particularly when elastomeric adhesives are used for laminate bonding, have unique properties in that the Kraft remains intact well beyond its own natural limits of tensile strength and extension. The Kraft takes on the strength and extension properties of stronger and more extensible reinforcing material, breaking under load only at the upper limit of tensile strength and extension of the reinforcing. Such interaction allows Kraft to be used in areas of use previously not suitable for Kraft on its own.

The sheet material used or the tape of this invention, in single tape or woven form, may be treated with water proofing agents, fungicides and such-like processes which better fit the material for a wide range of uses.

Having described my invention for purposes of illustration rather than limitation, what I claim is as follows:

1. A reinforced laminated flat tape suitable for weaving into fabric, comprising two outer layers each formed of a sheet material having a non-tacky outer surface and of prescribed positive friction, and an intermediate layer comprising an elongate thread of continuous filaments formed of high tensile synthetic material which extends longitudinally of the length of the tape and are spread to even thickness across the central part and most of the width of the tape but terminate laterally inward of each lateral edge of the tape, and a bonding material applied between the outer layers and across the full width of the tape securing the spread filaments together and to each sheet layer over the entire tape width and effecting a sheet to sheet only connection laterally outwardly of each lateral edge of the filaments and up to each edge of the tape.

2. The tape according to claim 1 which incorporates a thread of higher percentage extension at break than the sheet material.

* * * * *